April 18, 1950     G. E. MEYER ET AL     2,504,825
LAMINATED SPACER FOR VENTILATED DIE CAST ROTORS
Filed April 21, 1948
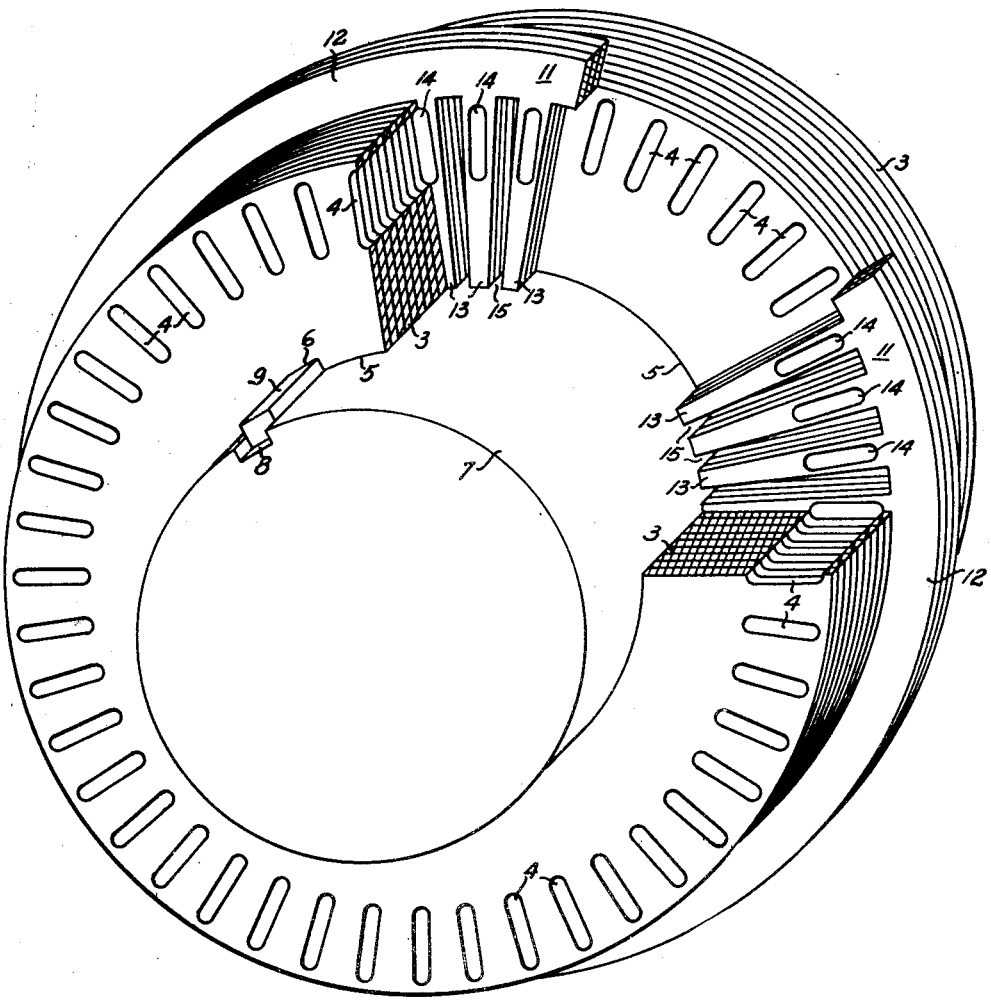
Inventors
George E. Meyer
Vernon B. Honsinger
by their Attorney Patented Apr. 18, 1950

2,504,825

UNITED STATES PATENT OFFICE 2,504,825

LAMINATED SPACER FOR VENTILATED DIE CAST ROTORS

George E. Meyer and Vernon B. Honsinger, Cincinnati, Ohio, assignors to Allis-Chalmers Manufacturing Company, Milwaukee, Wis., a corporation of Delaware Application April 21, 1948, Serial No. 22,484

6 Claims. (Cl. 172—36)

This invention relates generally to improvements in the manufacture of electric motors and refers particularly to ventilated squirrel cage rotors of the cast type now common in the art and to methods of making the same.

It is an object of this invention to provide a method of forming radial ventilating passages in a rotor through the use of a permanent spacer between groups of laminations, the spacer being made of any suitable material the excess of which is easily removable from the rotor after casting the rotor conductors.

It is also an object of this invention to maintain groups of rotor laminations permanently spaced apart before and after casting the rotor conductors by the formation of spacing means which remain when the excess of the spacer material is removed.

Another object of this invention is to form radial ventilating ducts in a laminated rotor by providing a permanent spacer that can be stacked in the same manner as the laminations.

The objects of the invention are preferably attained by the use of a spacer made of one or more punchings of sheet metal comprising teeth with apertures therein to cooperate with the conductor bar slots of the laminations to form a mold for the cast rotor conductors when the spacer is interposed between two groups of stacked laminations.

The novel features that are considered characteristic of this invention are set forth with particularity in the appended claims. The invention itself, together with objects and advantages thereof, will be best understood from the following description of a specific embodiment when read in connection with the accompanying drawing, which shows an oblique view of the assembled laminations and permanent spacer for a die cast rotor with parts thereof broken away.

Referring particularly to the drawing, the numeral 3 designates the rotor laminations which are made from thin sheets of steel of a suitable grade. The laminations 3 are punched to provide conductor bar slots 4 and a bore 5 having a keyway 6 for reception of a spider mounted on a rotor shaft.

For casting the rotor conductors the laminations are stacked on a mandrel 7 having a keyway 8 and are aligned with each other by means of a key 9 fitted in the keyways of the laminations and of the mandrel.

The mandrel keyway 8 may be parallel to the mandrel axis so that the conductor bar slots of the assembled laminations align without skew, or the keyway may be helical to cause the conductor bar slots of the assembled laminations to align with skew.

To provide one or more radial ventilating ducts in the finished rotor, at least one permanent spacer 11 is inserted between groups of laminations 3.

The spacer 11 may be punched from the same material as the laminations, and may comprise an annular portion 12 extending beyond a diameter equal to the outer diameter of the laminations. The annular portion 12 is provided with teeth 13 extending radially inward. Each of the teeth has an aperture 14 which aligns and cooperates with the slots 4 of the laminations when the spacer and laminations are assembled so as to form a mold for casting the conductor bars in the aligned slots and spacer apertures. The rotor laminations and the spacer are held in alignment by means of a key 9.

The apertures 14 in the spacer may be of the same size and configuration as the conductor bar slots 4, or they may be of a larger size than the slots.

The teeth of the spacer may be scored along a circle having the same diameter as the outer diameter of the laminations so that the annular portion 12 may be broken away after assembling.

After the core laminations 3 have been assembled with their slots 4 properly aligned and with at least one spacer 11 stacked therein between groups of the laminations with its apertures 14 aligned with the slots 4, the conductor bars are cast in the slots in any suitable known manner, the molten metal filling all of the slots and all of the apertures of the spacer. In this casting operation the end rings may also be formed by means common in the art.

After casting the conductor bars the spacer material 12 extending beyond the periphery of the laminations is removed by breaking, machining or otherwise, leaving the teeth 13 as permanent spacers between the two adjacent laminations to form radial ventilating ducts 15. If the spacer apertures 14 are larger than the slots 4, the conductor bars will have enlargements therein which will act as additional permanent spacing means between the two adjacent laminations.

In assembling the laminations and spacers prior to casting, a first group of rotor laminations is stacked on the mandrel, upon which are stacked the spacer laminations disposed so the apertures 14 of the teeth 13 align with the slots 4 of the first group of laminations. Upon the spacer members is stacked the next group of laminations with its slots aligned with the apertures of the teeth and the slots of the first group of laminations, and the assembled laminations are pressed together, binding the spacer teeth between the groups of rotor laminations.

If desired, the annular portion 12 of the spacer may be omitted and only the teeth 13 assembled in the core laminations. To facilitate stacking and radially disposing the teeth of such a spacer, a jib may be used to hold the teeth in place until the laminations and spacers all have been assembled and pressed together for casting.

The teeth of the spacer may have any suitable shape, and may be curved to act as fan blades in the radial ventilating duct of the rotor.

In the embodiment of the invention illustrated, the laminations are punched to a bore 5 to fit a rotor shaft and spider, the spider providing longitudinal ventilating passages to connect with the radial ventilating passages 15. The same result may be achieved by means of a splined shaft forming ventilating ducts, or by using laminations punched to provide longitudinal ventilating passages and mounting the core directly on the rotor shaft.

It is claimed and desired to secure by Letters Patent:

1. A permanent spacer for forming a radial ventilating duct in a laminated squirrel cage rotor to be provided with cast conductor bars embedded in aligned slots of the laminations, said spacer comprising at least one punching of the same metal of which the laminations are made, having a plurality of teeth extending inwardly from an outer portion to be disposed in its entirety outside the periphery of the laminations, and said teeth having apertures to be disposed in alignment with the conductor bar slots of the laminations.

2. The method of making a ventilated squirrel cage rotor having cast conductor bars embedded in slots of a laminated core which comprises the steps of stacking a group of laminations with their slots aligned, stacking on said group of laminations one or more punchings having apertured teeth projecting inwardly from an outer portion disposed in its entirely outside the outer periphery of said laminations and aligning the apertures of said teeth with said slots, stacking on said punchings another group of laminations with their slots aligned with the apertures of said teeth, casting the conductor bars in said slots and apertures, and subsequently reducing the outer periphery of said punchings to that of the laminations, leaving said teeth as permanent spacers forming radial ventilating ducts between said groups of laminations.

3. A permanent spacer for forming a radial ventilating duct in a laminated squirrel cage rotor to be provided with cast conductor bars embedded in aligned slots in the laminations, said spacer comprising at least one punching of sheet metal, having a plurality of teeth extending inwardly from an outer portion to be disposed in its entirety outside the periphery of the laminations, and said teeth having apertures to be disposed in alignment with the conductor bar slots of said laminations.

4. A permanent spacer for forming a radial ventilating duct in a laminated squirrel cage rotor to be provided with cast conductor bars embedded in aligned slots of the laminations, said spacer comprising at least one punching having a plurality of teeth extending inwardly from an outer portion to be disposed in its entirety outside the periphery of the laminations, and said teeth having apertures to be disposed in alignment with the conductor bar slots of the laminations, said apertures being larger than said slots.

5. A permanent spacer for forming a radial ventilating duct in a laminated squirrel cage rotor to be provided with cast conductor bars embedded in aligned slots of the rotor laminations stacked in parallel planes, said spacer comprising a plurality of apertured members radially disposed about a circle so that the apertures of said members may be disposed in alignment with the conductor bar slots of the laminations of said rotor, said apertures being larger than said slots, each of said members comprising a plurality of flat sheet metal parts stacked in said duct, the planes of said sheet metal parts being parallel to the planes of said laminations.

6. A permanent spacer for forming a radial ventilating duct in a laminated squirrel cage rotor to be provided with cast conductor bars embedded in aligned slots of the rotor laminations stacked in parallel planes, said spacer comprising a plurality of apertured members radially disposed about a circle so that the apertures of said members may be disposed in alignment with the conductor bar slots of the laminations of said rotor, each of said members comprising a plurality of flat sheet metal parts stacked in said duct, the planes of said sheet metal parts being parallel to the planes of said laminations.

GEORGE E. MEYER.
VERNON B. HONSINGER.

REFERENCES CITED

The following references are of record in the file of this patent:

UNITED STATES PATENTS

| Number | Name | Date |
| --- | --- | --- |
| 2,012,021 | Petersen | Aug. 20, 1935 |
| 2,176,871 | Harrell et al. | Oct. 24, 1939 |